Oct. 28, 1958  R. J. WILLIAMS ET AL  2,857,776
LEAD SCREW SELECTIVELY OPERABLE AND RELEASABLE UNDER LOAD
Filed Jan. 13, 1955
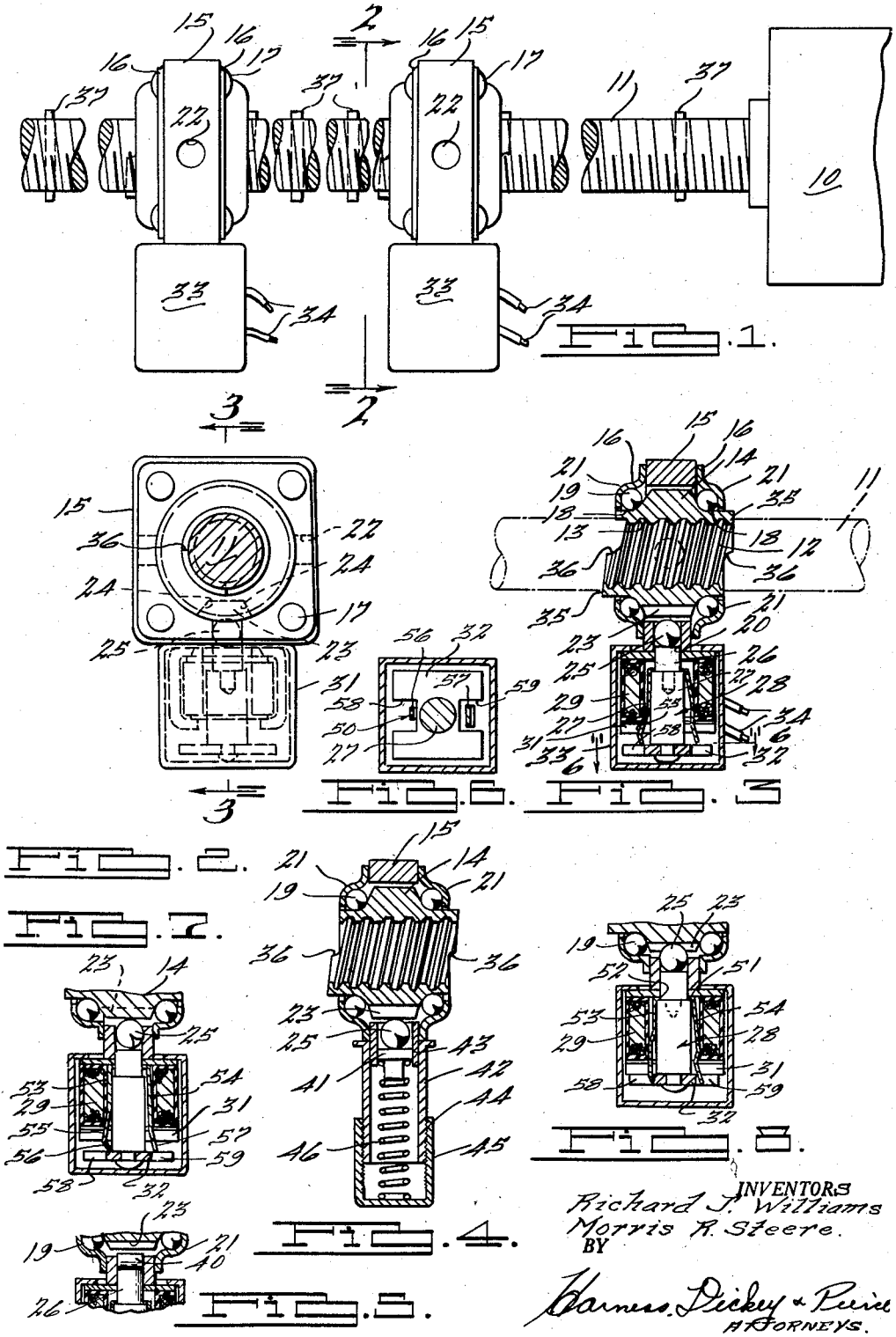
INVENTORS
Richard J. Williams
Morris R. Steere
BY
Harness, Dickey & Pierce
ATTORNEYS.

United States Patent Office 2,857,776
Patented Oct. 28, 1958

2,857,776

LEAD SCREW SELECTIVELY OPERABLE AND RELEASABLE UNDER LOAD

Richard J. Williams, Birmingham, and Morris R. Steere, Detroit, Mich., assignors to American Metal Products Company, Detroit, Mich., a corporation of Michigan Application January 13, 1955, Serial No. 481,562

14 Claims. (Cl. 74—424.8)

This invention relates to lead screw drives, and particularly to a lead screw drive having clutch means which limits the load applied by the driven nut.

A lead screw drive has many applications where it is desirable to limit the applied force or the movement of a member between predetermined points without overloading the driving motor. Such a lead screw drive could be employed successfully for moving a vehicle seat backwardly or forwardly within the vehicle body or for raising and lowering the seat relative to the body floor. The nut is permitted to travel backwardly or forwardly on the lead screw for the maximum adjustment of the seat, at either end of which the nut will rotate with the lead screw, preventing the nut from jamming or the motor from becoming overloaded. The drive is rendered inoperative without overstressing the mechanism driven by the nut and lead screw while the motor actually operates on a reduced load.

The lead screw of the present invention is of the standard type having a thread of slow helix angle and having a nut thereon with an internal thread which mates with that of the screw and to be driven thereby. The nut has a housing thereabout enclosed by stampings on each side which form raceways for a series of balls which engage the outer raceway surfaces at each end of the nut. The lever of the mechanism to be operated is secured to the housing in a suitable manner, preferably by a bifurcated end which engages the housing on opposite sides thereof. Each end of the nut is provided with a stop projection positioned to engage pins in the lead screw at opposite sides of the nut, spaced apart the distance which the nut is to travel thereon. The nut has a slot in its outer surface, with the side walls disposed at a predetermined angle forming cam surfaces relative to a ball which is projectable within the slot by a spring, the tension of which may be adjusted. The nut will be driven between the pins until one or the other stop projection strikes a pin, whereupon the stopping of the nut will cause the ball to be cammed outwardly of the slot as the lead screw is rotating, thus stopping the driving of the nut without overloading or stalling the motor.

When it is desired to operate the nut on the lead screw periodically at the will of the operator, a solenoid is supported on the housing of the nut in position to move the ball into the slot of the nut and retain it therein with a desirable pressure, depending upon the ampere turns of the solenoid coil. In this arrangement, the nut will only move on the lead screw when the solenoid is energized to retain the ball in the slot until the desired adjustment is made or until the travel of the nut on the lead screw is stopped by the interception of a stop projection by a pin on the lead screw, causing the nut to rotate therewith as the ball is cammed out of the slot. The angle of lead of the thread is such that in the normal operation of the lead screw the nut will be driven as long as the ball is retained within the slot. When, however, the resistance to the movement of the nut has increased beyond a predetermined amount either by that offered by the element being moved or by the pins interrupting the rotation of the nut, one of the sides of the slot of the nut will cam out the ball so that the nut will rotate with the lead screw and thereby prevent the overloading and damage to the motor or the straining of the elements beyond a safe limit. It should be noted that a plurality of the nuts may be operated on a single lead screw, each operating between a pair of pins thereon and either one or all of which may be driven at the same time to produce the operation which each is capable of performing.

Accordingly, the main objects of the invention are: to provide a lead screw having a nut thereon which is rendered inoperative to drive an element beyond a predetermined point on the lead screw; to provide a lead screw with a driven nut, the movement along the lead screw of which is interrupted when the load on which the nut is operating exceeds a predetermined amount; to provide a nut on a lead screw with a releasing cam operated to locking position by means under control of the operator for producing a drive between the nut and the lead screw which is interrupted when the load on the lead screw exceeds a predetermined amount or when the nut has traveled to a predetermined position on the lead screw; to provide a lead screw with a plurality of nuts thereon which are normally inoperative but which may be rendered operative by clutch means actuated by solenoids which produce a predetermined pressure for retaining the nut against rotation but permit rotation with the lead screw when the load exceeds a predetermined amount or when the nut reaches a predetermined point in its travel along the lead screw; and, in general, to provide a lead screw drive which becomes inoperative when a predetermined load is exceeded or when the nut reaches a predetermined point on the lead screw, which is simple in construction, positive of operation and economical of manufacture.

Other objects and features of novelty of the invention will be specifically pointed out or will become apparent when referring, for a better understanding of the invention, to the following description, taken in conjunction with the accompanying drawing, wherein:

Figure 1 is a broken view in elevation of a lead screw having a plurality of nuts thereon, embodying features of the present invention;

Fig. 2 is a sectional view of the structure illustrated in Fig. 1, taken on the line 2—2 thereof;

Fig. 3 is a sectional view of the structure illustrated in Fig. 2, taken on the line 3—3 thereof;

Fig. 4 is a view of structure, similar to that illustrated in Fig. 3, showing another form of the invention;

Fig. 5 is a broken view of the structure illustrated in Fig. 3, showing a further form thereof;

Fig. 6 is a sectional view of the structure illustrated in Fig. 3, taken on the line 6—6 thereof;

Fig. 7 is a broken view of the structure illustrated in Fig. 3, showing the armature of the solenoid in lock-out position, and Fig. 8 is a view of the structure illustrated in Fig. 6, with the armature of the solenoid in actuated position.

Referring to the figures, a motor 10 drives through a suitable reduction gear for driving a lead screw 11 of standard construction. The lead screw 11 has a thread 12 of slow helical lead engaged with a mating internal thread 13 of a nut 14. A housing 15 encompasses the central portion of the nut 14, enclosed by a pair of side plates 16 which are retained in position by suitable means, herein illustrated as by rivets 17. Arcuate shoulders 18 are provided along each edge of the nut forming raceways for ball bearings 19 which are engaged by the arcuate portions 21 of the plates 16. With this arrangement, the nut is free to rotate within the housing 15 and to drive the housing in either direction along the lead screw. Oppositely disposed apertures 22 are provided in the housing 15 for anchoring the ends of a bifurcated lever which is driven by the nut and housing. The nut has a slot 23 radially disposed therein having sloping side walls 24 which form cam surfaces relative to a ball 25 which is projectable within the slot.

As illustrated in Fig. 3, the ball 25 is disposed within an aperture 20 at the bottom of the housing 15, aligned with a nonmagnetic plunger 26 which is secured on an armature 27 of a solenoid 28. A coil 29 is supported within a U-shaped pole piece 31 of magnetic material which provides a field about the coil. A plate 32 is secured to the end of the armature 27 made of magnetic material for bridging the gap between the ends of the pole piece 31. The entire solenoid is enclosed within an insulating case 33 from which a pair of leads 34 extends.

It will be noted that the nut will not be driven until the armature of the solenoid 28 is moved upwardly to shaft the ball into the slot 23 of the nut. When in this position, the nut is held against rotation and will be driven along the lead screw until restrained with sufficient force to cause the ball to be cammed outwardly of the slot 23 against the force of the armature 27 of the solenoid. The nut will thereafter continue to rotate with the lead screw 11, with the ball dropping within the slot 23 on each revolution, thereby producing a clicking noise and warning the operator that the mechanism is overloaded and therefore not operating. With this arrangement, the parts of the mechanism operated by the nut will not be overstressed and the motor driving the lead screw will not be overloaded.

If the lead screw has two of the nut assemblies thereon, one for driving a lever for moving a vehicle seat forwardly and rearwardly and the other for moving the seat upwardly and downwardly, no adjustment will be made until the lead screw is driven and one or the other of the solenoids is energized to secure a nut against rotation. Both the horizontal and vertical adjustments may be made simultaneously or either one of the adjustments may be made separately, as desired.

It will be noted further in the figures that the nut 14 has an extension 35 at each end forming a shoulder 36 projecting outwardly at each end of the nut. Pins 37 are provided on each side of both of the nut assemblies, spaced apart the maximum distance of travel required to adjust the elements which, in the example hereinabove given, is the degree of forward and rearward movement and upward and downward movement of the seat. As soon as one of the shoulders 36 strikes a pin 37, the nut will rotate with the lead screw and the ball 25 will be cammed out of the slot during each rotation, which prevents overloading of the motor and straining the mechanism. It is to be understood that by reversing the direction of operation of the motor 10, the lead screw will be operated in the reverse direction of rotation and the nut will be moved either forwardly or rearwardly on the lead screw.

Referring to Fig. 4, a further form of the invention is illustrated, that wherein the housing 15 has a plunger 41 engaging the ball 25. An externally threaded sleeve 44 is supported on the housing by flat flanges 43, the sleeve having an internally threaded cap 45 screwed thereon. A spring 46 is mounted within the sleeve 44 between the plunger 41 and the cap 45 for producing a predetermined spring pressure on the ball. By adjusting the cap on the sleeve 44, the tension on the spring 46 is changed, thereby changing the overload pressure required to cam the ball 25 from the slot 23. The nut is held at all times against rotation so that a driving relation is present between the nut and the lead screw. The tension on the ball limits the maximum load that can be applied by the nut. When this load is exceeded, the ball will be cammed out of the slot and the nut will rotate with the lead screw.

Thus, it will be noted that the ball will always be cammed out upon the striking of a shoulder 36 with a pin 37 at the end of the predetermined length of travel of the nut on the lead screw. Further, it will be noted that the brake means formed by the slot 23 and ball 25 may be released when the load thereon reaches a predetermined amount to have the operation interrupted so as not to stress the operated parts beyond a factor of safety. It should also be noted that by changing the slope 24 of the notch 23, the pressure on the ball 25 either by the solenoid 28 or the spring 46, and the lead angle of the thread 12, a locking force may be provided whereby all of the available torque from the motor 10 may be applied through the nut until the motor actually stalls. Even with this relationship, the engagement of the shoulder of a nut with a pin 37 will interrupt the relative rotation between the nut and lead screw. It will be noted in Fig. 5 that a roller 40 is substituted for the ball 45. In this arrangement, advantage is provided of having a line rather than a point contact with the sloping sides 24 of the notch 23 to reduce wear.

Referring specifically to Figs. 3, 6, 7 and 8, a spring clutch 50 is illustrated which retains the armature 27 of the solenoid in open position after the ball is cammed to open position by one of the sloping walls 24. As illustrated in Fig. 3, the ball is no longer urged toward the nut and will not be forced into the slot 23 as the lead screw 11 and nut continue to rotate as a unit. The spring clutch 50 is of U shape and made of spring steel or like material having a bottom web 51 containing an aperture 52 through which the nonmagnetic plug 26 extends. Arm portions 53 and 54 extend from the web 51 and are in diverging relationship to each other. The arm 53 has a V-shaped bend 55 therein near the end, the outer branch 56 being reduced in width, as illustrated in Fig. 6. The arm 54 has the upper end 57 reduced in width and bent outwardly from the main portion of the arm. The ends 56 and 57 of the arms are in position to extend within slots 58 and 59, respectively, of the armature plate 32.

As illustrated in Fig. 3, when the solenoid is deenergized, the V-shaped portion 55 of the arm 53, the diverging relation of the arms 53 and 54, and the weight of the armature cause it to drop downwardly, thereby moving the ball 25 from the notch 23. In this relationship, the end of the outer branch 56 projects within the slot 58 of the plate 32 in a position to be ineffective to prevent the movement of the armature. When the solenoid coil 29 is energized, the armature and spring clutch 50 move inwardly to hold the ball within the notch 23, as illustrated in Fig. 8. When the shoulder 36 strikes a pin 37, the nut will rotate with the lead screw and the ball 25 will be cammed out of the slot 23, causing the armature to move outwardly while the spring clutch 50 will be retained by the magnetic force against the pole piece 31. This relationship is illustrated in Figs. 7 and it will be noted that the end of the outer branch 56 of the arm 53 of the clutch spring has moved inwardly against the armature portion 27 on the inner side of the plate 32 in locking relation therewith. The flux path provided by the energized coil 29 is ineffective in having the armature overcome the spring clutch 50 so that the nut is free to rotate without the ball 25 being urged within the notch, thereby eliminating wear and the noise which would otherwise occur. When, however, the coil 29 is de-energized, the magnetic force holding the spring against the pole piece is eliminated and the diverging relationship between the arms 53 and 54 causes the spring to snap outwardly into the position illustrated in Fig. 3 where it is ineffective to prevent the armature from moving inwardly to advance the ball 25 within the slot 23. A simple lockout arrangement is provided by the clutch spring 50 which eliminates the pressure on the ball 25 and the urging of it within the slot 23 after it has been cammed outwardly therefrom, which eliminates wear from the walls of the slot and the attending noise.

What is claimed is:

1. The combination with a lead screw having a thread thereon, a nut having an internal thread engaging the thread on the lead screw, a yoke within which said nut is rotatably mounted, bearing means between said yoke and nut preventing lateral shifting therebetween, a slot in said nut, a ball in said yoke, and a solenoid for urging said ball into said slot with a predetermined pressure.

2. The combination with a lead screw having a thread thereon, a nut having an internal thread engaging the thread on the lead screw, a yoke within which said nut is rotatably mounted, bearing means between said yoke and nut preventing lateral shifting therebetween, a slot in said nut, a ball in said yoke, a solenoid for urging said ball into said slot with a predetermined pressure, said nut having extending shoulders on the opposite ends thereof, and pins extending from said lead screw in position to engage either one or the other of the shoulders for limiting the travel of the nut which moves the ball from the slot when the shoulder engages a pin.

3. The combination with a lead screw having a thread thereon, a nut having an internal thread engaging the thread on the lead screw, a yoke within which said nut is rotatably mounted, bearing means between said yoke and nut preventing lateral shifting therebetween, a slot in said nut, a ball in said yoke, a solenoid for urging said ball into said slot with a predetermined pressure, and abutment means on said lead screw engageable by said nut for limiting the travel of the nut which causes the ball to be cammed from the slot and the nut to rotate with the lead screw.

4. The combination with a lead screw having a thread thereon, a nut having an internal thread engaging the thread on the lead screw, a yoke within which said nut is rotatably mounted, bearing means between said yoke and nut preventing lateral shifting therebetween, a slot in said nut, a ball in said yoke, a solenoid for urging said ball into said slot with a predetermined pressure, said nut having extending shoulders on the opposite ends thereof, pins extending from said lead screw in position to engage either one or the other of the shoulders for limiting the travel of the nut which moves the ball from the slot when the shoulder engages a pin, a second nut similar to said first nut mounted on said lead screw, and additional spaced pins remote from said first pins one on each side of said second nut for limiting the travel of the nut on said lead screw.

5. In a lead screw assembly, a plurality of nuts thereon, solenoid actuated brake means releasably locking the nuts thereon, against rotation with the lead screw, and means applying a predetermined pressure to said brake means, said brake means being released when the applied force between a nut and the lead screw reaches a predetermined amount so that one nut may be released independently of another when a plurality are simultaneously driven.

6. In a lead screw assembly, a plurality of nuts thereon, brake means releasably locking the nuts against rotation with the lead screw, and means applying a predetermined pressure to said brake means, said brake means being released when the applied force between a nut and the lead screw reaches a predetermined amount, said pressure applying means being solenoids, said solenoids being selectively actuated to operate the nuts independently and simultaneously.

7. In a lead screw assembly, a plurality of nuts thereon, brake means releasably locking the nuts against rotation with the lead screw, means applying a predetermined pressure to said brake means, said brake means being released when the applied force between a nut and the lead screw reaches a predetermined amount, said pressure applying means being solenoids which are selectively energized to have the ends engaged independently and collectively, and lockout means in said solenoid which renders the solenoid ineffective to actuate the associated brake means once it has been disengaged while the solenoid remains energized.

8. The combination with a lead screw having a thread, a nut threaded on said lead screw, means engaged by said nut which is operated thereby, releasable brake means for securing said nut against rotation with a predetermined pressure which is released to have the nut rotate with the lead screw when the load exceeds a predetermined amount, and means for rendering said brake means ineffective once it has been moved to released position.

9. The combination with a lead screw having a thread, a nut threaded on said lead screw, means engaged by said nut which is operated thereby, releasable brake means for securing said nut against rotation with a predetermined pressure which is released to have the nut rotate with the lead screw when the load exceeds a predetermined amount, said brake means being normally in released position, a solenoid for moving said brake means to engaged position, and lockout means on said solenoid which renders it ineffective for moving said brake means to engaged position once the brake means has been moved to disengaged position while said solenoid remains energized.

10. A lead screw having a thread thereon, a nut having an internal thread screwed on said lead screw for movement therealong, a yoke in which said nut is mounted for relative rotation, releasable brake means on said yoke for securing said nut to said yoke, solenoid means on said yoke for actuating said brake means for moving said brake means into engaged position, said solenoid having a movable armature, and lockout means on said solenoid for engaging said armature upon the disengagement of the brake means and for preventing the armature from again actuating the brake means while the solenoid is energized.

11. The combination with a lead screw having a nut thereon which is operated thereby, a carrier for said nut, brake means on said carrier and nut for preventing the nut from rotating with the lead screw under normal conditions, a solenoid on said carrier having an armature for urging said brake means to engaged position, and lockout means engaging said armature and retaining it inoperative when moved by said brake means upon the disengagement of the brake means from the nut in the presence of abnormal conditions, said lockout means rendering the armature ineffective to re-engage said brake means while the solenoid is energized.

12. The combination with a lead screw having a nut thereon which is operated thereby, a carrier for said nut, brake means on said carrier and nut for preventing the nut from rotating with the lead screw under normal conditions, a solenoid on said carrier having a pole piece, a coil and a movable armature for engaging said brake means, and lockout means associated with said armature for retaining the armature from said pole piece when it has been forcibly moved therefrom by the release of the brake means in the presence of abnormal conditions while the coil is energized.

13. The combination with a lead screw having a nut thereon which is operated thereby, a carrier for said nut, brake means on said carrier and nut for preventing the nut from rotating with the lead screw under normal conditions, a solenoid on said carrier having a pole piece, a coil and a movable armature for engaging said brake means, lockout means associated with said armature for retaining the armature from said pole piece when it has been forcibly moved therefrom by the release of the brake means in the presence of abnormal conditions while the coil is energized, said lockout means embodying a spring on said armature which is movable therewith to engage the pole piece when the coil is energized, the spring being retained in position of engagement with the pole piece when the armature is forcibly moved therefrom, and means on said spring for engaging the armature when so moved for preventing it from moving toward the pole piece while the coil remains energized.

14. The combination with a lead screw having a nut thereon which is operated thereby, a carrier for said nut, brake means on said carrier and nut for preventing the nut from rotating with the lead screw under normal conditions, a solenoid on said carrier having a pole piece, a coil and a movable armature for engaging said brake means, and lockout means associated with said armature for retaining the armature from said pole piece when it has been forcibly moved therefrom by the release of the brake means in the presence of abnormal conditions while the coil is energized, said lockout means embodying a spring bent to U-shape having diverging arms which are moved inwardly to engage the armature when the armature and spring are moved toward the pole piece and which are retained by the pole piece when the armature is forcibly moved therefrom and which engage and lock the armature from moving toward the pole piece while the coil remains energized.

References Cited in the file of this patent

UNITED STATES PATENTS

| | | |
|---|---|---|
| 534,180 | Smart et al. | Feb. 12, 1895 |
| 1,268,264 | Murray | June 4, 1918 |
| 1,276,811 | Ragan | Aug. 27, 1918 |
| 1,618,308 | Richards | Feb. 22, 1927 |
| 2,038,466 | Yates | Apr. 21, 1936 |
| 2,182,452 | Rose | Dec. 5, 1939 |
| 2,311,230 | Hill | Feb. 16, 1943 |
| 2,363,021 | Steele | Nov. 21, 1944 |
| 2,477,701 | McCallum | Aug. 2, 1949 |
| 2,602,664 | Matchett | July 8, 1952 |
| 2,644,120 | Swanton | June 30, 1953 |
| 2,662,418 | Flinn | Dec. 15, 1953 |
| 2,701,478 | Reiss | Feb. 8, 1955 |
| 2,743,623 | Wells | May 1, 1956 |
| 2,768,532 | Russell | Oct. 30, 1956 |

UNITED STATES PATENT OFFICE
CERTIFICATE OF CORRECTION

Patent No. 2,857,776

October 28, 1958

Richard J. Williams et al.

It is hereby certified that error appears in the printed specification of the above numbered patent requiring correction and that the said Letters Patent should read as corrected below.

Column 3, line 22, for "shaft" read -- shift --; column 5, line 52, strike out "thereon,".

Signed and sealed this 31st day of March 1959.

(SEAL)
Attest:

KARL H. AXLINE
Attesting Officer

ROBERT C. WATSON
Commissioner of Patents